United States Patent [19]

Hall

[11] Patent Number: 4,694,918

[45] Date of Patent: * Sep. 22, 1987

[54] ROCK BIT WITH DIAMOND TIP INSERTS

[75] Inventor: David R. Hall, Provo, Utah

[73] Assignee: Smith International, Inc., Newport Beach, Calif.

[*] Notice: The portion of the term of this patent subsequent to Aug. 5, 2003 has been disclaimed.

[21] Appl. No.: 829,022

[22] Filed: Feb. 13, 1986

Related U.S. Application Data

[63] Continuation-in-part of Ser. No. 728,177, Apr. 29, 1985, Pat. No. 4,604,106, which is a continuation-in-part of Ser. No. 600,399, Apr. 16, 1984, Pat. No. 4,525,178.

[51] Int. Cl.$^4$ .............................................. E21B 10/52
[52] U.S. Cl. .................................. 175/329; 175/410; 175/414; 51/293; 51/309
[58] Field of Search .............. 175/329, 409, 410, 411, 175/414; 51/293, 309

[56] References Cited

U.S. PATENT DOCUMENTS

| | | | |
|---|---|---|---|
| 3,745,623 | 7/1973 | Wentorf, Jr. et al. | 29/95 B |
| 3,941,197 | 3/1976 | Stinson | 175/410 |
| 4,109,737 | 8/1978 | Bovenkerk | 175/410 |
| 4,140,189 | 2/1979 | Garner | 175/410 |
| 4,202,421 | 5/1980 | Pinck | 175/415 |
| 4,333,540 | 6/1982 | Daniels | 175/329 |
| 4,481,016 | 11/1984 | Campbell et al. | 51/293 |
| 4,525,178 | 6/1985 | Hall | 51/293 |
| 4,604,106 | 8/1986 | Hall et al. | 51/293 |

FOREIGN PATENT DOCUMENTS

| | | | |
|---|---|---|---|
| 2151283 | 7/1985 | United Kingdom | 175/329 |
| 1086110 | 4/1984 | U.S.S.R. | 175/329 |

OTHER PUBLICATIONS

Megadiamond Announcement, dated Oct. 6, 1981.

Primary Examiner—Stephen J. Novosad
Assistant Examiner—Terry Lee Melius
Attorney, Agent, or Firm—Christie, Parker & Hale

[57] ABSTRACT

A percussion rock bit comprises a steel body having means for connection to a drill string at one end and having a plurality of inserts at the other end for crushing rock at the bottom of a hole being drilled. The inserts have a cemented tungsten carbide body partially embedded in the steel bit and at least two layers at the protruding drilling portion of the insert. The outermost layer contains polycrystalline diamond. The remaining layers adjacent the polycrystalline diamond layer are transition layers containing a composite of diamond crystals and precemented tungsten carbide, the composite having a higher diamond crystal content adjacent the polycrystalline diamond layer and a higher precemented tungsten carbide content adjacent the tungsten carbide layer.

Another embodiment of rock bit has three cones with tungsten carbide inserts in the cutting structure of each cone. The gage row inserts have a layer of polycrystalline diamond on the converging portion protruding from the surface of the cone. One or more transition layers are provided between the tungsten carbide insert body and the polycrystalline diamond layer. Such a transition layer comprises diamond and precemented tungsten carbide.

54 Claims, 8 Drawing Figures

ROCK BIT WITH DIAMOND TIP INSERTS

CROSS-REFERENCE TO RELATED APPLICATIONS

This application is related to U.S. patent application Ser. No. 789,120, entitled Rock Bit with Wear Resistant Inserts, filed Oct. 18, 1985 now abandoned, and is a continuation-in-part of U.S. patent application Ser. No. 728,177, entitled Improved Composite Polycrystalline Diamond Compact, filed Apr. 29, 1985, now U.S. Pat. No. 4,604,106, which is a continuation-in-part of U.S. patent application Ser. No. 600,399, filed Apr. 16, 1984, now U.S. Pat. No. 4,525,178. The disclosure of each patent and application listed above is incorporated herein.

FIELD OF THE INVENTION

This invention relates to rock bits for drilling blastholes, oil wells, or the like, having polycrystalline diamond-tipped inserts for drilling rock formation.

BACKGROUND OF THE INVENTION

Percussion tool bits are employed for drilling rock, for instance as in drilling wells, or more frequently for drilling blastholes for blasting in mines and construction projects. The bits are connected to a drill string at one end and typically have a plurality of cemented tungsten carbide inserts embedded in the other end for drilling rock formations. In use, the drill string and bit body are moved up and down rapidly, striking the rock being drilled in a percussive motion. A typical air hammer for percussion bits operates at about 2,000 blows per minute and rotates at about 60 r.p.m. Some percussion bits are driven through hydraulic action. The percussion bit hammers the inserts against the rock being drilled, shattering it by repeated blows. Compressed air pumped through the bit removes chips of fractured rock from the bore hole being drilled. Such bits range in size from 75 millimeters to more than 25 centimeters in diameter.

Rock bits wear out or fail in such service after drilling many meters of bore hole. The cost of the bits is not considered so much in the cost of the bit, per se, as much as it is considered as the cost of drilling per length of hole drilled. It is considered desirable to drill as much length of bore hole as possible with a given bit before it is used to destruction. It is also important that the gage diameter of the holes being drilled remain reasonably near the desired gage. Thus, wear of the bit that would reduce the hole diameter is undesirable. Further, wear of the inserts in the bit during drilling reduces their protrusion from the surface of the steel bit body. The protrusion, has a strong influence on the drilling rate. Thus, as the inserts wear out, the rate of penetration may decrease to the extent that it becomes uneconomical to continue drilling. It is therefore quite desirable to maximize the lifetime of a drill bit in a rock formation, both for reducing bit costs and for maintaining a reasonable rate of penetration of the bit into the rock.

Heavy duty rock bits are employed for drilling wells in subterranean formation for oil, gas, geothermal steam and the like. Such bits have a body connected to a drill string and a plurality typically three, of hollow cutter cones mounted on the body for drilling rock formations. The cutter cones are mounted on steel journals or pins integral with the body at its lower end. In use the drill string and bit body are rotated in the bore hole and each cone is caused to rotate on its respective journal as the cone contacts the bottom of the bore hole being drilled. As such a rock bit is used in hard, tough formations, high pressures and temperatures are encountered. The total useful life of a rock bit in such severe environments is in the order of 20 to 200 hours for bits in sizes of about $6\frac{1}{2}$ to $12\frac{1}{4}$ inch diameter at depths of about 5000 to 20,000 feet. Useful lifetimes of about 65 to 150 hours are typical.

When a rock bit wears out or fails as a bore hole is being drilled, it is necessary to withdraw the drill string for replacing the bit. The amount of time required to make a round trip for replacing a bit is essentially lost from drilling operations. This time can become a significant portion of the total time for completing a well, particularly as the well depths become great. It is therefore quite desirable to maximize the lifetime of a drill bit in a rock formation. Prolonging the time of drilling minimizes the lost time in "round tripping" the drill string for replacing bits.

Replacement of a drill bit can be required for a number of reasons, including wearing out or breakage of the structure contacting the rock formation. The other principal reason for replacing a rock bit on a drill string is that the bearings supporting one or more of the roller cones fail due to excessive wear, loss of lubricant or the like. There are a variety of other minor causes of failure in rock bits in some rock formations. There is a continual effort to upgrade the performance and lengthen the lifetime of those components of a rock bit that are likely to cause a need for replacement. There have been continual improvements in bearings, but few major improvements in the cutting structure of rock bits.

When a rock bit is drilling a bore hole, it is important that the diameter or gage of the bore hole be maintained at the desired value. The outermost row of inserts on each cone of a rock bit is known as the gage row. This row of inserts is subjected to the greatest wear since it travels furthest on the bottom of the hole, and the gage row inserts also tend to rub on the sidewall of the hole as the cones rotate on the drill bit body. As the gage row inserts wear, the diameter of the bore hole being drilled may decrease below the original gage of the rock bit. When the bit is worn out and removed, a bottom portion of the hole is usually under gage. When the next bit is run in the hole, it is therefore necessary to ream that bottom portion of the hole to bring it to the full desired gage. This not only takes substantial time but commences wear on the gage row inserts, which again results in an under gage hole as the second bit wears out. Further, as the bit reams, a side load is applied to the cones, "pinching" the bit and applying a high side load on the bearings, which can cause premature failure of the bearings.

The rate of penetration of a rock bit into the rock formation being drilled is an important parameter for drilling. Clearly, it is desirable to maintain a high rate of drilling since this reduces the time required to drill the bore hole, and such time can be costly because of the fixed costs involved in drilling. The rate of penetration decreases when the inserts in the bit become worn and do not protrude from the surface to the same extent they did when drilling commences. The worn inserts have an increased radius of curvature and increased contact area on the rock. This reduces the rate of penetration.

Thus, it is important to maximize the wear resistance of the inserts in a rock bit to maintain a high rate of penetration as long as feasible. It is particularly important to minimize wear of the gage row inserts to maximize the length of hole drilled to full gage.

Wear resistance of conventional inserts of cemented tungsten carbide may be enhanced by increasing the proportion of tungsten carbide and decreasing the proportion of cobalt in the composite material. This increases the hardness and wear resistance of the cemented tungsten carbide but reduces its toughness so that the inserts are more susceptible to breakage than inserts with higher cobalt content. In exemplary embodiments, the cobalt content of inserts for use in rock bits ranges from about six percent to sixteen percent by weight cobalt.

Another factor that influences wear resistance and toughness is particle size of the tungsten carbide phase. Exemplary particle size in an insert is in the range of from three to seven microns. This particle size is an average particle size of a powder mixture that includes larger and smaller particles. For example, when the average particle size is five microns, there are submicron size particles present as well as particles as large as seven or eight microns. Generally speaking, toughness increases with larger particle size and so does wear resistance. A common grade of cemented tungsten carbide for rock bit inserts has an average tungsten carbide particle size of about six microns and contains about ten to fourteen percent by weight cobalt.

Toughness of the inserts is important in a rock bit since the inserts are subjected to impact loads, as well as wear by rubbing against the rock formation. Breakage of inserts can be a substantial problem since it not only results in reduced drilling activity, but the fragments of a broken insert may damage other inserts. It is therefore desirable to provide inserts that are hard, to resist wear, and tough, to resist breakage.

BRIEF SUMMARY OF THE INVENTION

There is, therefore, provided in practice of this invention according to a presently preferred embodiment, a rock bit having a steel body with means at one end for connecting the bit to a drill string and a plurality of inserts at the other end for exerting percussive force on the bottom of a bore hole, and thus crushing the rock to be drilled. At least some of those inserts comprise a cemented tungsten carbide body having a shank portion embedded in the head of the bit and a converging end portion protruding from the surface of the head.

A rock bit is therefore provided in practice of this invention with a steel body having means at one end for connecting the bit to a drill string, and means at the opposite end for mounting roller cones for rotation around an axis transverse to the axis of the bit. Each of the roller cones mounted on the body for rolling on the bottom of a bore hole being drilled includes a plurality of inserts for crushing rock at the bottom of the bore hole. At least a portion of those inserts comprise a cemented tungsten carbide body having a grip length embedded in the cone and a converging end portion protruding from the surface of the cone.

The converging portion of the insert includes at least one outer layer containing polycrystalline diamond and at least one transition layer between the polycrystalline diamond layer and the cemented carbide body. The transition layer comprises a composite material containing diamond crystals, cobalt and precemented tungsten carbide particles. The diamond crystal content of the composite material is greatest adjacent the polycrystalline diamond layer and lowest adjacent the cemented tungsten carbide body.

DETAILED DESCRIPTION

As used in this specification the term polycrystalline diamond, along with its abbreviation "PCD" refers to the material produced by subjecting individual diamond crystals to sufficiently high pressure and high temperature that intercrystalline bonding occurs between adjacent diamond crystals. Exemplary minimum temperature is about 1300° C. and an exemplary minimum pressure is about 35 kilobars. The minimum sufficient temperature and pressure in a given embodiment may depend on other parameters such as the presence of a catalytic material, such as cobalt, with the diamond crystals. Generally such a catalyst/binder material is used to assure intercrystalline bonding at a selected time, temperature and pressure of processing. As used herein, PCD refers to the polycrystalline diamond including residual cobalt. Sometimes PCD is referred to in the art as "sintered diamond".

Figure 1:
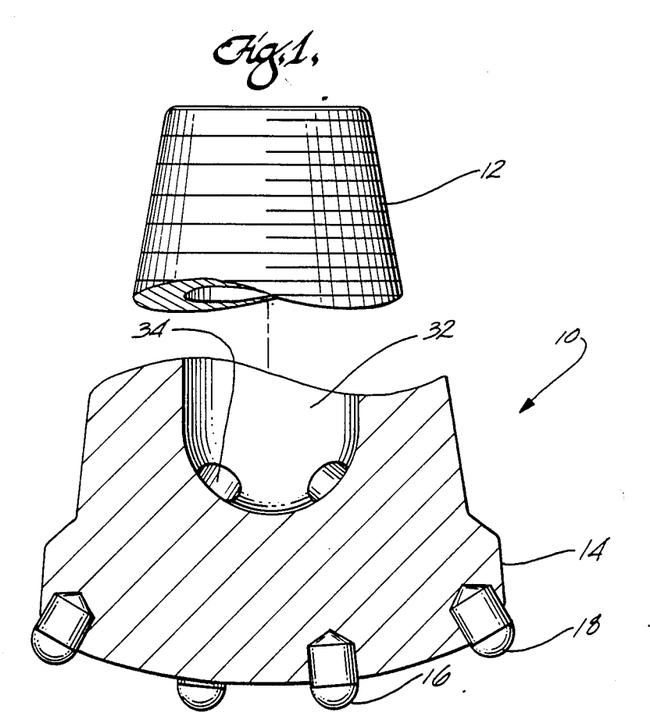
FIG. 1 is a fragmentary longitudinal cross-section of the exemplary rock bit.

FIG. 1 is a fragmentary longitudinal cross-section of an exemplary percussion rock bit. The bit comprises a hollow steel body 10 having a threaded pin 12 at the upper end of the body for assembly of the rock bit onto a drill string for drilling oil wells or the like. The body includes a cavity 32 and holes 34 communicating between the cavity and the surface of the body. The holes divert the air pumped through the bit by the air hammer, out of the cavity into the borehole to provide cooling and remove rock chips from the hole.

The lower end of the body terminates in a head 14. The head is enlarged relative to the body 10 and is somewhat rounded in shape. A plurality of inserts 16 are provided in the surface of the head for bearing on the rock formation being drilled. The inserts provide the drilling action by engaging and crushing subterranean rock formation on the bottom of a bore hole being drilled as the rock bit strikes the rock in a percussive motion. The outer row of inserts 18 on the head is referred to as the gage row since these inserts drill the gage or outer diameter of the bore hole.

Figures 2, 3:
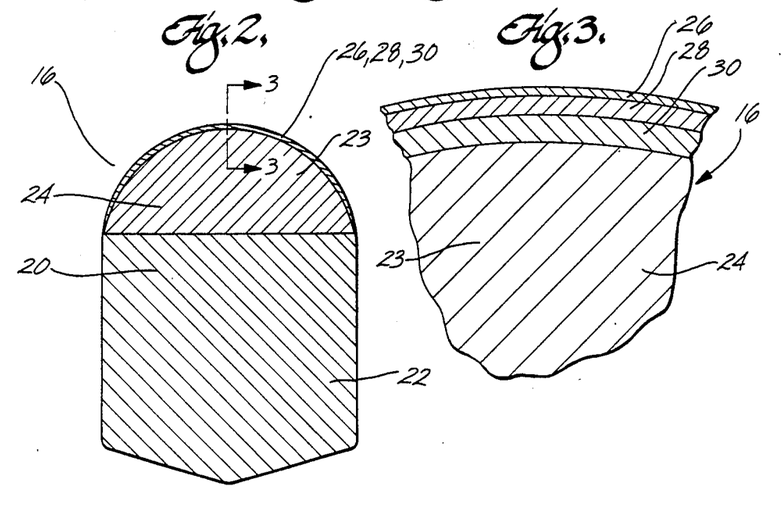
FIG. 2 is a cross-section of one of the inserts of the rock bit shown in FIG. 1.
FIG. 3 is an enlarged cross-section along line 3—3 in FIG. 2.

An exemplary insert is illustrated in FIG. 2. Such an insert comprises a precemented tungsten carbide body 20 having a cylindrical grip length extending along a major portion of the insert. At the lower end of the body, protruding from the face of the bit, the insert has a converging portion 24. The converging portion illustrated in FIG. 2 has the preferred hemispherical shape; however, the converging portion may have any of a variety of shapes depending on the desired cutting structure. The converging portion may also be described as a projectile shape, a cone with a rounded end, a chisel shape, or any of a variety of shapes known in the art.

Typically, the inserts are embedded in the bit by press-fitting or brazing into the head 14 of the bit. The head has a plurality of conical bottomed holes on its outer surface. The inner end of the insert is conical to fit closely to the bottom of the hole and distribute stresses uniformly to the steel bit body 10. An exemplary hole has a diameter about 0.13 mm smaller than the diameter of the grip of an exemplary insert. The insert is pressed into the hole in the steel head with many thousand pounds of force. This press fit of the insert into the bit tightly secures the insert in place and prevents it from being dislodged during drilling.

Preferably, the body 20 of the insert is made of two pieces of cemented tungsten carbide bonded together. In the exemplary embodiment, the border between the two pieces of carbide is located at about the base of the converging portion 24, that is, at about the end of the portion of the insert that protrudes from the surface of the head. The inner carbide piece 22 embedded in the head of the bit comprises 614 grade tungsten carbide (6 micron tungsten carbide particles; 14 percent by weight cobalt content) and the outer carbide piece 23 adjacent the inner carbide piece comprises 406 grade tungsten carbide (4 micron tungsten particles; 6 percent by weight cobalt content).

The converging portion 24 of the exemplary insert includes an outer layer 26 for engaging rock and two transition layers, outer transition layer 28 and inner transition layer 30, between the outer layer 26 and the cemented tungsten carbide body of the insert.

The outer layer 26 comprises polycrystalline diamond (PCD) that includes a mixture of diamond crystals and between one and ten percent by volume (preferably six percent by volume) cobalt. In the exemplary embodiment, the outer layer 26 is 130 microns thick. A range of thickness between 80 microns and 1300 microns is suitable. An outer layer thinner than 80 microns is likely to show thin spots, decreasing its drilling effectiveness.

The transition layers 28 and 30 comprise a composite of diamond crystals, cobalt and precemented tungsten carbide containing a greater proportion of diamond crystals near the outer PCD layer 26 and a greater proportion of precemented tungsten carbide particles near the insert body 22. While the currently preferred embodiment comprises two distinct transition layers, any number of transition layers can be used, as long as the proportion of diamond crystals decreases inwardly towards the cemented tungsten carbide body. A single transition layer with an inwardly decreasing gradient of diamond crystals can also be used.

The exemplary outer transition layer 28 adjacent the outer layer 26 comprises a mixture of diamond crystals, cobalt and precemented tungsten carbide particles. Preferably, the layer comprises 75 percent by volume preferred diamond crystals and 25 percent by volume precemented tungsten carbide. The preferred diamond portion includes between one and ten percent (preferably six percent) cobalt. Consequently, in a preferred embodiment, the outer transition layer 28 includes 70.5 percent diamond crystals, 4.5 percent cobalt and 25 percent precemented tungsten carbide. It will be recognized that the precemented tungsten carbide moiety also includes cobalt. The exemplary outer transition layer is approximately 250 microns thick; a range of thickness between 50 microns and 5000 microns is suitable. An outer transition layer thinner than 50 microns is likely to show thin spots.

The exemplary inner transition layer 30 includes 50 percent by volume preferred diamond crystals and 50 percent by volume precemented tungsten carbide. Again, the preferred diamond portion includes between one and ten percent (preferably six percent) cobalt. Consequently, the preferred embodiment of layer 30 includes 50 percent by volume precemented tungsten carbide, 3 percent by volume cobalt and 47 percent by volume diamond crystals. The exemplary inner transition layer is approximately 380 microns thick; a range of thickness between 50 microns and 5000 microns is suitable. An outer transition layer thinner than 50 microns is likely to show thin spots.

In an alternative preferred embodiment, the outer transition layer 28 includes 60 percent by volume preferred diamond, that is, 3.6 percent by volume cobalt, and 56.4 percent by volume diamond, and 40 percent by volume precemented tungsten carbide. The inner transition layer 30 includes 40 percent by volume preferred diamond, that is, 2.4 percent by volume cobalt and 37.6 percent by volume diamond, and 10 percent by volume tungsten carbide.

In an exemplary embodiment, the outer layer of PCD is made from a mixture of diamond crystals and cobalt powder, with 13 percent by weight or six percent by volume of cobalt in the total mixture. Preferably, the catalyst metal is present in the range of from one to ten percent by volume. In some embodiments, other catalyst metals such as iron and nickel may be used.

The diamond crystal size can range upwardly from submicron sizes. Preferably, about 65 percent of the diamond crystals are in the range of 4 to 8 microns; the other 35 percent of the diamond crystals are in the range of one-half to one micron. The diamond crystals may be either naturally occurring diamonds or synthetic diamonds produced by a high temperature and high pressure process.

The raw materials for making the PCD layer are preferably milled together for a sufficient time to thoroughly coat the diamond particles with cobalt. Milling in a ball mill lined with cemented tungsten carbide and using cemented tungsten carbide balls is preferred to avoid contamination of the diamond. An attritor or planetary mill may be used if desired. Such milling should be sufficiently energetic to "smear" the cobalt but should avoid appreciable comminution of the diamond particles. One or two days of ball milling is appropriate. Intercrystalline bonding between adjacent diamonds occurs and a unitary solid polycrystalline diamond matrix is formed when the milled materials are subjected to high temperature, and at a sufficient pressure that the diamond is thermodynamically stable.

The precemented tungsten carbide is made by blending tungsten carbide powder and cobalt powder in a ball mill or the like. The blended powders are compacted and sintered near the melting point of cobalt. The resultant compact is comminuted to the desired particle size for use in making the composite material of the transition layers 28 and 30. In an exemplary embodiment a grit size of $-325$ U.S. mesh (about 44 microns) precemented tungsten carbide is used in the composite material of the transition layers.

The precemented tungsten carbide grit can have a variety of tungsten carbide particle sizes and shapes, and various cobalt contents. The cobalt content can be in the range of from five to sixteen percent by weight and the tungsten carbide particles are preferably in the range of from four to fifteen microns. In an exemplary embodiment the particle size is six microns and the cobalt content is fourteen percent by weight.

When making the composite material of the transition layers, it is preferred to thoroughly blend the powders. Preferably, the diamond crystals and cobalt powder are ball milled together as hereinabove described. After initial milling, precemented tungsten carbide grit is added, with or without additional cobalt, and the mixture is further milled for thoroughly blending and smearing the mixture. For example, diamond and cobalt powders may be ball milled together for up to a day before addition of tungsten carbide grit. This mixture is then ball milled for another one or two days. Forty-eight hours is an exemplary ball milling time.

The composite material of each transition layer is made separately as described above. The procedure is the same for each transition layer; the only variation is in the relative proportions of precemented tungsten carbide grit and diamond crystals and cobalt powders.

Figure 8:
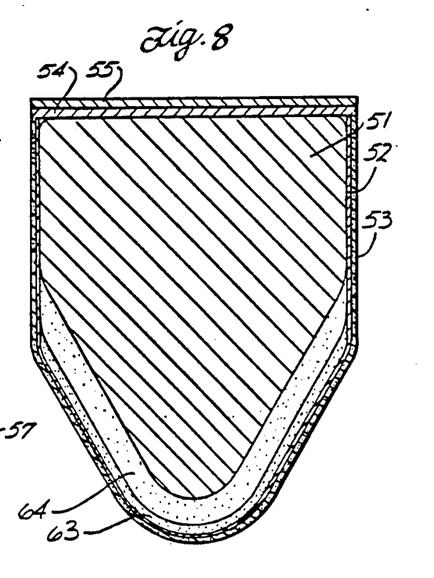
FIG. 8 is a longitudinal cross section of a subassembly for forming such a rock bit insert.

The blended powders for making the layers on the insert are sintered and bonded to a rock bit insert blank 51 in an assembly of the type illustrated in FIG. 8. The insert being formed in the embodiment illustrated in FIG. 8 has layers somewhat different from those in the embodiment of FIG. 6 as hereinafter described, but the manufacturing technique is the same. The insert blank 51 comprises a cylindrical cemented tungsten carbide body having a converging portion at one end. The converging portion has the geometry of the completed insert, less the thickness of the layers to be formed thereon. The assembly is formed in a deep drawn metal cup which preferably has double walls. There is an inner cup 52, the inside of which is formed to the desired net shape of the end of the rock bit insert to be preformed. The inner cup is zirconium sheet having a thickness of 50 to 125 microns. The outer cup 53 is molybdenum with a thickness of 250 microns. A zirconium sheet 54 and molybdenum sheet 55 close the assembly at the top. The zirconium "can" thus formed protects material within it from the effects of nitrogen and oxygen. The molybdenum can protects the zirconium from water which is often present during the high pressure, high temperature pressing cycle used to form the rock bit insert.

To make such an assembly as illustrated in FIG. 8, blended diamond powder, including cobalt, may be placed in the cup and spread into a thin layer by rotation and pressing with an object having the same shape as the insert blank when the blank is axisymmetric. If desired, the insert blank can be used to spread the powder. Powder to make the outer layer is spread first, then powder to make the first transition layer is added and spread on the outer layer. Additional transition layers are formed in the same manner. Finally, the insert blank is put in place and the metal sheets are added to close the top of the assembly. A small amount of paraffin wax may be included in the blended powders to aid distribution and retention of the powder in thin layers. Alternatively, layers can be built up on the end of the insert blank before insertion into the cup. In another embodiment, sufficient wax may be included with the powders to form self-supporting "caps" of blended powder to be placed on the insert blank or in the cups.

After assembly is made by one of such techniques, it is preferable to press the assembly through a die to swage the cups tightly against their contents.

One or more of such assemblies is then placed in a conventional high pressure cell for pressing in a belt press or cubic press. A variety of known cell configurations are suitable. An exemplary cell has a graphite heater tube surrounding such an assembly and insulated from it by salt or pyrophyllite for sealing the cell and transmitting pressure. Such a cell, including one or more such assemblies for forming a rock bit insert, is placed in a high pressure belt or cubic press and sufficient pressure is applied that diamond is thermodynamically stable at the temperatures involved in the sintering process. In an exemplary embodiment, a pressure of 50 kilobars is used.

As soon as the assembly is at high pressure, current is passed through the graphite heater tube to raise the temperature of the assembly to at least 1300° C. and preferably to 1350° to 1400° C. When the assembly has been at high temperature for a sufficient period for sintering and formation of polycrystalline diamond, the current is turned off and the parts rapidly cooled by heat transfer to the water cooled anvils of the press. When the temperature is below 1300° C., and preferably below 200° C., pressure can be released so that the cell and its contents can be ejected from the press. The metal cans and any other adhering material can be readily removed from the completed insert by sand blasting or etching. The grip of the completed insert may be diamond ground to a cylinder of the desired size for fitting in a hole in the cone of a rock bit. The composite layers of diamond crystals and precemented carbide particles are, of course, sintered by the high temperature and pressure and are no longer in the form of discrete particles that could be separated from each other. The layers sinter to each other and the two cemented carbide pieces forming the body of the insert sintered to each other.

The transition layers help ensure that the insert is hard enough to drill hard rock formation without suffering undue wear and yet tough enough to avoid breakage or spalling. The outer polycrystalline diamond layer is very hard. It crushes the rock formation being drilled effectively, and it resists wear through abrasion. However, it is also somewhat brittle, having a higher modulus of elasticity than the cemented tungsten carbide body. The presence of transition layers between the outer layer and the cemented tungsten carbide body minimizes a sharp drop in elasticity between the polycrystalline diamond outer layer and the cemented tungsten carbide body, that would otherwise contribute to spalling of the PCD layer from the insert. Because of the progressive decrease in diamond content and increase in carbide content, the modulus of elasticity progressively decreases from the PCD layer to the carbide body. This can be accomplished through the use of discrete transition layers as in the preferred embodiment, the transition layer adjacent the outer layer having a higher proportion of diamond crystals than the transition layer adjacent the cemented tungsten carbide body, or by a gradient of diamond crystals and precemented tungsten carbide, the proportion of diamond crystals decreasing towards the cemented tungsten carbide body.

The extra stability provided by the transition layers is especially desirable in light of the force exerted on percussion bits during use. Percussion bits are subjected to greater impact loads than rotary bits which exert force on the rock through rotary rather than percussive motion. Consequently, not only must the drilling portion of the insert be harder to be effective, but the insert is more likely to chip or spall. The combination of an outer diamond layer and one or more transition layers between the diamond layer and the tungsten carbide body provides a drilling surface that is hard and resistant to wear while minimizing the probability of chipping or spallig due to a sharp discontinuity in elasticity.

PCD-tipped percussion bits were tested in a sandstone formation as well as a granite formation. Typical footage in sandstone using a percussion bit with standard tungsten carbide inserts and no diamond layer, without resharpening the bit, is 350 to 500 feet. Using a PCD-tipped insert percussion bit as herein described, the bits have drilled an average of 2,500 feet. Footage of as much as 3,758 feet has been obtained. The bit failed only when the steel eroded and the inserts fell out.

In granite, the typical footage for a standard tungsten carbide insert percussion bit without resharpening is 600 feet or less. If the bit is resharpened the footage may be as much as 1,200 feet; however, the bit must be resharpened every 150 feet, or eight times during its useful lifetime. A PCD-tipped insert percussion bit has drilled as much as 1,455 feet in granite.

The degree of wear of PCD-tipped inserts has been compared with the wear of tungsten carbide inserts on the same bit. The PCD-tipped inserts showed no discernible signs of wear even when the tungsten carbide inserts were nearly worn away. This was the case even when the PCD-tipped inserts were located on the gage row, which usually wears out first.

The performance of inserts having different compositions, including the inserts of this invention, has been tested in the field. Table I lists the composition of the inserts, and Table II lists the performance of each insert.

TABLE I

COMPOSITION OF INSERTS

| No. | 1st layer | Thickness (mils) | 2nd layer | Thickness (mils) | 3rd layer | Thickness (mils) | Grade Carbide |
|---|---|---|---|---|---|---|---|
| 1 | None | | | | | | 411 |
| 2 | None | | | | | | 614 |
| 3 | Titanium diboride | | | | | | 406 |
| 4 | Titanium boride | | | | | | 614 |
| 5 | 100% D* | 10 | | | | | 614 |
| 6 | 100% D* | 4–6 | | | | | 614 |
| 7 | 100% D* | 20 | | | | | 614 |
| 8 | 100% D* | 4–6 | | | | | 614 |
| 9 | 100% D* | 5 | | | | | 614 |
| 10 | 100% D* | | | | | | 406 |
| 11 | 60% D* 40% 514 PTC | | | | | | 614 |
| 12 | 40% D* 60% PTC includes 17% Co; graphite | | | | | | 614 |
| 13 | 40% D* 60% 411 PTC | | | | | | 614 |
| 14 | 20% D* 80% 514 PTC | | | | | | 614 |
| 15 | 100% D* | | 40% D* | | | | 614 |
| 16 | 100% D* | | 40% D* 60% PTC includes 12% Co | | | | 614 |
| 17 | 100% D* | | 40% D* 60% PTC includes 12% Co | | | | 614 |
| 18 | 80% D* 20% PTC includes 10% CO | | 40% D* 60% PTC includes 12% Co | | | | 614 |
| 19 | 60% D* 40% PTC includes 12% Co | 5 | 40% D* 60% PTC includes 12% Co | 15 | | | 614 |
| 20 | 60% D* 40% PTC includes 12% Co | | 40% D* 60% PTC includes 12% Co | | | | 614 |
| 21 | 60% D* 40% PTC includes | | 40% D* 60% PTC includes | | | | 614 |

TABLE I-continued
COMPOSITION OF INSERTS

| No. | 1st layer | Thickness (mils) | 2nd layer | Thickness (mils) | 3rd layer | Thickness (mils) | Grade Carbide |
|---|---|---|---|---|---|---|---|
| 22 | 12% Co 100% D* | <5 | 12% Co 60% D* | <10 | 40% D* | <15 | 614 |
| 23 | 100% D* | <5 | 10% D* | <10 | 40% D* | <15 | 614 |
| 24 | 100% D* | | 40% D* 12% Co in PTC SA 201 | | | | 614 |
| 25 | 100% D* | >5 | 60% | >10 | 40% D* | >15 | 614 |
| 26 | 100% D* | 5 | 60% D* | 10 | 40% D* | 15 | 614 |
| 27 | 100% D** | 3 | 60% D** | 10 | 40% D** | 15 | 614 |
| 28 | 100% D* | 5 | 60% D* | 10 | 40% D* | 15 | 614 |
| 29 | 100% D* | 5 | 60% D* | 10 | 40% D* | 15 | 614 |
| 30 | 100% D* | 5 | 60% D* | 10 | 40% D* | 15 | 614 |
| 31 | 100% D* | 5 | 60% D* | 10 | 40% D* | 15 | 614 |
| 32 | 100% D* | 5 | 60% D* | 10 | 40% D* | 15 | 614 |
| 33 | 100% D* | 5 | 60% D* | 10 | 40% D* | 15 | 614 |
| 34 | 100% D* | 5 | 60% D* | 10 | 40% D* | 15 | 614 |
| 35 | 100% D* | 6 | 60% D* green tungsten carbide | 10 | 4% D* green tungsten carbide | 15 | 614 |
| 36 | 100% D* | 10 | 60% D* | 15 | 40% D* | 25 | 614 |
| 37 | 100% D* | 5 | 60% D* | 10 | 40% D* | 15 | 614 |
| 38 | 100% D* | 5 | 60% D* | 10 | 40% D* | 15 | 614 |
| 39 | 100% D* | 5 | 60% D* | 10 | 40% D* | 15 | 614 |
| 40 | 100% D* | 5 | 40% D* | 30 | | | 614 |
| 41 | 100% D*** | 5 | 40% D*** | 10 | 40% D*** | 15 | 614 |
| 42 | 75% D* | 5 | 40% D* | 15 | 40% D* | 15 | 614 |
| 43 | 100% D* | 5 | 60% D* | 10 | 40% D* | 15 | 411 |
| 44 | 100% D* | 5 | 60% D* | 10 | 40% D* | 25 | 614 |
| 45 | 100% D* | 5 | 60% D* | 10 | 40% D* | 15 | 614 |
| 46 | 100% D* | 5 | 60% D* green tungsten carbide | 10 | 40% D* green tungsten carbide | 15 | 614 |
| 47 | 100% D* | 5 | 60% D* | 10 | 40% D* | 15 | 411 |
| 48 | 100% D* | 5 | 60% D* green tungsten carbide | 10 | 40% D* green tungsten carbide | 15 | 411 |
| 49 | 100% D* | 5 | 60% D* | 10 | 40% D* | 15 | 614 |
| 50 | 100% D* | 5 | 60% D* | 10 | 40% D* | 15 | 310 |
| 51 | 100% D* | 5 | 60% D* | 10 | 40% D* | 15 | 411 |
| 52 | 100% D* | 5 | 60% D* feathered | 10 | 40% D* feathered | 15 | 614 |
| 53 | 100% D* | 5 | 60% D* | 10 | 40% D* | 15 | 614 |
| 54 | 100% D* | 5 | 60% D* | 10 | 40% D* | 15 | 411 |
| 55 | 100% D* | 5 | 60% D* | 10 | 40% D* | 15 | 406 |
| 56 | 100% D* | 5 | 60% D* green tungsten carbide | 10 | 40% D* green tungsten carbide | 12 | 411 |
| 57 | 100% D* | 5 | 60% D* | 10 | 40% D* | 15 | 310 |
| 58 | 100% D* | 5 | 60% D* | 10 | 40% D* | 15 | 411 |
| 59 | 100% D* | 5 | 75% D* | 10 | 50% D* | 15 | 411 |
| 60 | 100% D* | 5 | 60% D* | 10 | 40% D* | 15 | 411 |
| 61 | 100% D* | 5 | 60% D* | 10 | 40% D* | 15 | 406/614 |
| 62 | 100% D* | 5 | 75% D* | 10 | 50% D* | 15 | 406 |
| 63 | 100% D* | 5 | 75% D* | 10 | 50% D* | 15 | 411 |
| 64 | 100% D* | 5 | 75% D* | 10 | 50% D* | 15 | 406 |
| 65 | 100% D | 5 | 75% D* | 10 | 50% D* | 15 | 406 |

*65% 4 to 8 micron and 35% 0.5 to 1 micron diamond crystals including 13 percent by weight cobalt.
**65% 4 to 8 and 35% 0.5 to 1 micron diamond crystals including 22 percent by weight cobalt.
***60 micron diamond crystals.
D: diamond crystals.
Co: cobalt.
PTC: precemented tungsten carbide.
All percentages of diamond crystals are by volume.
All percentages of PTC are by volume.
All percentages of cobalt are by weight.
Grade tungsten carbide or precemented tungsten carbide: $n^1n^2n^3$ signifies $n^1$ micron tungsten carbide particles including $n^2n^3$ percent by weight cobalt. For example, 514 PTC refers to 5 micron precemented tungsten carbide particles including 14 percent by weight cobalt.

TABLE II
PERFORMANCE

| Insert Number | Rock Formation | Footage (ft) | Comments |
|---|---|---|---|
| 1 | Sandstone | 30 | 4 of 9 inserts chipped and delaminated. |
| 2 | Sandstone | 30 | Excessive wear. |
| 3 | Sandstone | 100 | |
| 4 | Sandstone | 95 | Delamination of coating; excessive carbide wear. |
| 5 | Sandstone | 700 | Inserts broken, cracked, worn flat. |
| 6 | Sandstone | 288 | 2 inserts broken; all worn flat. |
| 7 | Sandstone | 244 | All inserts worn flat; none broken or cracked. |
| 8 | Sandstone | 178 | All inside row inserts and 1 gage row insert delaminated; all gage row inserts microfractured. |
| 9 | Sandstone | 140 | Chipping and delamination. |
| 10 | Sandstone | 120 | 1 gage row insert broken. All but 2 inserts show signs of chipping, spalling, delamination. |
| 11 | Sandstone | 150 | 4 of 9 inserts chipped and delaminated. |
| 12 | Sandstone | 60 | Coating perforated on all but 1 insert. Abrasion of insert dome. |
| 13 | Sandstone | 70 | Micro-chipping. |
| 14 | Sandstone | 30 | Coating worn through by abrasion. |
| 15 | Sandstone | 1050 | Inserts show some chipping. |
| 16 | Sandstone | 1428 | No damage on gage row. |
| 17 | Sandstone | 1300 | 1 insert damaged on C-gage row; A and B rows worn flat. |
| 18 | Sandstone | 200 | Inserts worn flat. |
| 19 | Sandstone | 1417 | Tested on short run. Did less well than on long run. |
| 20 | Sandstone | 1891 | One chipped insert on A row. |
| 21 | Sandstone | 2630 | One chipped insert on A row. |
| 22 | Sandstone | 800 | Inserts damaged or worn flat. |
| 23 | Sandstone | 1122 | 1 insert worn flat on A and C rows; all B-row inserts worn flat. |
| 24 | Sandstone | 1500 | Some chipping on all rows. |
| 25 | Sandstone | 1477 | No damage except for some wear on flux regions. |
| 26 | Sandstone | 1700 | Some wear on C row gage. |
| 27 | Sandstone | 2371 | A lot of wear and some breakage on B row. |
| 28 | Sandstone | 75 | Some side chipping on all rows. |
| 29 | Sandstone | 1040 | Inserts on A and C rows fell out. B row inserts loose. |
| 30 | Sandstone | 1800 | Flame spray coating. Only 2 inserts left on A row. |
| 31 | Sandstone | 900 | All inserts severely damaged. |
| 32 | Sandstone | 1570 | 3 inserts failed due to spalling. |
| 33 | Sandstone | 2100 | Spalling. |
| 34 | Sandstone | 300 | Some wear on gage contact. |
| 35 | Sandstone | 3000 | Works as well as presintered tungsten carbide. Several inserts worn flat. |
| 36 | Sandstone | 100 | 9 inserts severely damaged. |
| 37 | Sandstone | 60 | 5 inserts damaged. |
| 38 | Sandstone | 1300 | 3 of 6 inserts chipped or spalled. |
| 39 | Sandstone | 1200 | No damage to inserts. |
| 40 | Sandstone | 415 | Chipping of 1st layer. |
| 41 | Sandstone | 1118 | No chipping or spalling but not very wear-resistant. |
| 42 | Sandstone | 2016 | All inserts showed wear; little chipping. |
| 43 | Sandstone | 3759 | No damage to A row; 2 broken inserts on B row. |
| 44 | Sandstone | 1981 | Some chipping on all inserts. |
| 45 | Sandstone | 1570 | All inserts damaged or broken off. |
| 46 | Sandstone | 1956 | All but one insert missing. Lead was used to seat inserts. |
| 47 | Sandstone | 2956 | |
| 48 | Sandstone | 2337 | All but 2 inserts badly damaged. |
| 49 | Sandstone | 1382 | All inserts chipped and cracked. |
| 50 | Sandstone | 1200 | Gage row inserts broke off. |
| 51 | Sandstone | 2100 | No damage to inserts except slight wear. |
| 52 | Sandstone | 1200 | No damage to inserts. |
| 53 | Granite | 250 | No damage to A row; B row breakage; C row spalling. |
| 54 | Granite | 100 | All but one A row inserts broke off. |
| 55 | Granite | 1455 | 7 inserts in good shape; rest broken off. |
| 56 | Granite | 320 | All B and C row inserts delaminated. No breakage of carbide. |
| 57 | Granite | 300 | Spalling of one insert. |
| 58 | Granite | 360 | Chipping and spalling. |
| 59 | Granite | 1354 | |
| 60 | Granite | 595 | Breakage of some inserts. |

TABLE II-continued

| Insert Number | Rock Formation | Footage (ft) | Comments |
|---|---|---|---|
| 61 | Granite | 162 | Spalling on 614 grade carbide inserts. |
| 62 | Granite | 1120 | 2 broken inserts. |
| 63 | Granite | 1215 | 5 broken inserts. |
| 64 | Granite | 385 | Layers in good shape; inserts on gage row broke. |
| 65 | Granite | 1150 | |

A row is the innermost row of inserts.
B row is the intermediate row of inserts.
C row is the outermost row of inserts.

Further details of tests of the PCD-tipped percussion bits made in practice of this invention are set forth in the Appendix to this specification.

Figures 4, 6:
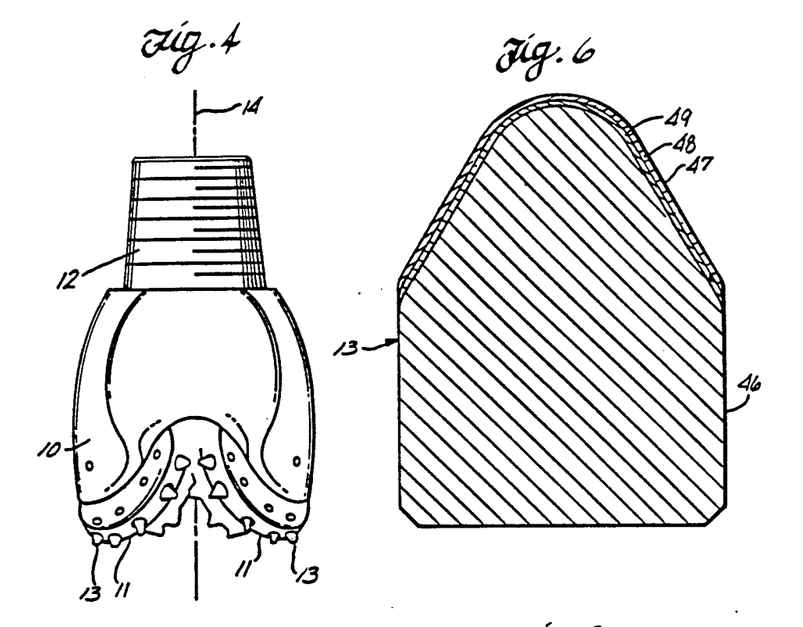
FIG. 4 illustrates in semi-schematic perspective another exemplary rock bit.
FIG. 6 is a longitudinal cross section of an exemplary insert for such a rock bit.

Another exemplary rock bit as illustrated in FIG. 4 comprises a steel body 110 having three cutter cones 111 mounted on its lower end. A threaded pin 112 is at the upper end of the body for assembly of the rock bit onto a drill string for drilling oil wells or the like. A plurality of tungsten carbide inserts 113 are provided in the surfaces of the cutter cones for bearing on rock formation being drilled.

Figure 5:
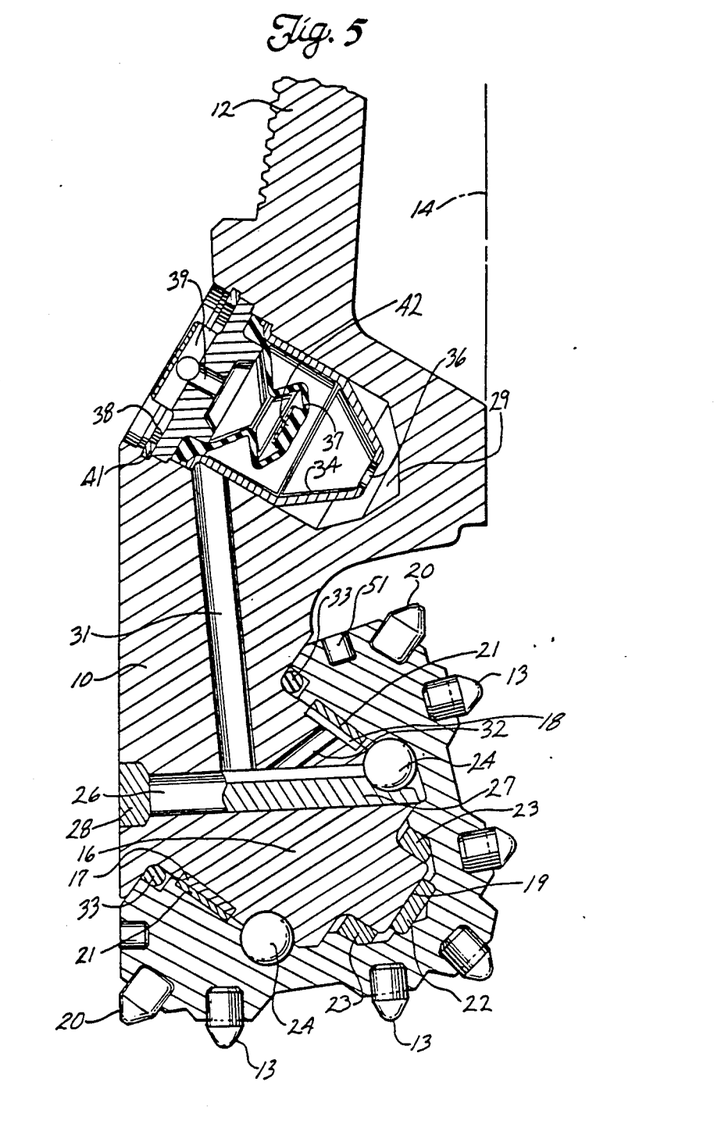
FIG. 5 is a partial longitudinal cross section of such a rock bit.

FIG. 5 is a fragmentary longitudinal cross section of the rock bit extending radially from the rotational axis 114 of the rock bit through one of the three legs on which the cutter cones 111 are mounted. Each leg includes a journal pin 116 extending downwardly and radially inwardly of the rock bit body. The journal pin includes a cylindrical bearing surface having a hard metal insert 117 on a lower portion of the journal pin. The hard metal insert is typically a cobalt or iron base alloy welded in place in a groove on the journal leg and having a substantially greater hardness than the steel forming the journal pin and rock bit body. An open groove 118 corresponding to the insert 117 is provided on the upper portion of the journal pin. Such a groove can, for example, extend around 60% or so of the circumference of the journal pin and the hard metal 117 can extend around the remaining 40% or so. The journal pin also has a cylindrical nose 119 at its lower end.

Each cutter cone 111 is in the form of a hollow generally conical steel body having tungsten carbide inserts 113 pressed into holes on the external surface. The outer row of inserts 120 on each cone is referred to as the gage row since these inserts drill at the gage or outer diameter of the bore hole. Such tungsten carbide inserts provide the drilling action by engaging and crushing subterranean rock formation on the bottom of a bore hole being drilled as the rock bit is rotated. The cavity in the cone contains a cylindrical bearing surface including an aluminum bronze insert 121 deposited in a groove in the steel of the cone or as a floating insert in a groove in the cone. The aluminum bronze insert 121 in the cone engages the hard metal insert 117 on the leg and provides the main bearing surface for the cone on the bit body. A nose button 122 is between the end of the cavity in the cone and the nose 119, and carries the principal thrust loads of the cone on the journal pin. A bushing 123 surrounds the nose and provides additional bearing surface between the cone and journal pin.

A plurality of bearing balls 124 are fitted into complementary ball races in the cone and on the journal pin. These balls are inserted through a ball passage 126 which extends through the journal pin between the bearing races and the exterior of the rock bit. A cone is first fitted on the journal pin and then the bearing balls 124 are inserted through the ball passage. The balls carry any thrust loads tending to remove the cone from the journal pin and thereby retain the cone on the journal pin. The balls are retained in the races by a ball retainer 127 inserted through the ball passage 126 after the balls are in place. A plug 128 is then welded into the end of the ball passage to keep the ball retainer in place.

The bearing surfaces between the journal pin and cone are lubricated by a grease which fills the regions adjacent the bearing surfaces plus various passages and a grease reservoir. The grease reservoir comprises a cavity 129 in the rock bit body which is connected to the ball passage 126 by a lubricant passage 131. Grease also fills the portion of the ball passage adjacent the ball retainer, the open groove 118 on the upper side of the journal pin and a diagonally extending passage 132 therebetween. Grease is retained in the bearing structure by a resilient seal in the form of an O-ring 133 between the cone and journal pin.

A pressure compensation subassembly is included in the grease reservoir 129. This subassembly comprises a metal cup 134 with an opening 36 at its inner end. A flexible rubber bellows 37 extends into the cup from its outer end. The bellows is held in place by a cap 38 having a vent passage 39 therethrough. The pressure compensation subassembly is held in the grease reservoir by a snap ring 41.

The bellows has a boss 42 at its inner end which can seat against the cap 38 at one end of the displacement of the bellows for sealing the vent passage 39. The end of the bellows can also seat against the cup 134 at the other end of its stroke, thereby sealing the opening 36.

In practice of this invention at least a portion of the cutting structure of the rock bit comprises tungsten carbide inserts that are tipped with polycrystalline diamond. An exemplary insert is illustrated in longitudinal cross section in FIG. 6. Such an insert has a cylindrical grip length 46 extending along a major portion of the insert. At one end there is a converging portion 47 which may have any of a variety of shapes depending on the desired cutting structure. The converging portion may be referred to as a projectile shape or basically a cone with a rounded end. It may be a chisel shape which is like a cone with converging flats cut on opposite sides and a rounded end. The converging portion may be hemispherical or any of a variety of other shapes known in the art.

Such an insert is press fitted or brazed into the roller cone. Each one of the cones has a plurality of flat bottomed holes in circumferential rows on its outer surface. An exemplary hole has a diameter about 0.13 millimeters smaller than the diameter of the grip 46 of an exemplary insert. The insert is pressed into the hole in the steel cone with many thousand pounds of force.

This press fit of the insert into the cone tightly secures the insert in place and prevents it from being dislodged during drilling.

The converging portion of the insert illustrated in FIG. 6, has an outer layer 48 for engaging rock when the insert is used in a rock bit, and an inner layer 49 between the outer layer and the main cemented tungsten carbide body of the insert. The outer layer in an exemplary embodiment comprises polycrystalline diamond (PCD) with a thickness of 125 microns. The inner layer has a thickness of 380 microns and comprises a composite material of polycrystalline diamond and precemented tungsten carbide, such as disclosed in U.S. Pat. No. 4,525,178.

In an exemplary embodiment the inner layer between the layer of polycrystalline diamond and the cemented tungsten carbide substrate is made from a mixture of forty percent by volume of the aforementioned diamond powder (containing six percent by volume cobalt) and sixty percent by volume precemented tungsten carbide grit. If desired, additional cobalt can be included depending on the cobalt content of the cemented tungsten carbide.

Two experimental rock bits formed in practice of this invention have been tested during drilling of wells in formation that is moderately difficult to drill in West Texas. The formations drilled included salt, shale, dolomite, mixed sandstone and shale, mixed sandstone and anhydrite, and mixed sandstone and dolomite. Each of these bits was seven and seven-eights inch diameter across the gage. The shape of the inserts employed was the same as the shape of conventional inserts in rock bits typically used in the same oil field formations (Smith Tool type F37).

In each of the bits the inserts in the gage row were tipped with polycrystalline diamond as hereinabove described. Each cemented tungsten carbide insert blank was made with six micron tungsten carbide particles and 14% by weight cobalt. The inner layer had a thickness of 380 microns and was formed from 40% by volume of a diamond-cobalt mixture with 6% by volume cobalt, and 60% by volume of −325 mesh precemented tungsten carbide grit. The outer layer was PCD with a nominal thickness of 125 microns. There was some unevenness in forming the outer layer and in some areas it is believed that the layer was as thin as 75 microns.

The other inserts (other than the gage inserts) in the cutting structure on the rock bit were conventional tungsten carbide inserts made with six micron tungsten carbide powder and 14% cobalt.

One of the bits was used to drill from a depth of 1514 feet to a depth of 4094 feet or a total footage of 2580 feet. The bit was used for forty-five and one-quarter hours for an average penetration rate of 57 feet per hour. During the run the weight on the bit was in the range of from 15,000 to 50,000 pounds (6800 to 22,700 kilograms) and the bit was rotated at speeds in the range of from 67 to 106 RPM. The maximum WR of the bit was 425 which is a little below average for the field being drilled. WR refers to the weight on the bit times the rotational speed divided by the bit gage diameter.

This run may be compared with runs with conventional bits in seven nearby wells drilled with the same drilling rig at roughly comparable depths. An average run lasted 54 hours and drilled a depth of 2848 feet for a rate of penetration of about 53 feet per hour. Thus the bit with diamond tipped inserts in the gage row on each cone was run at an above average penetration rate, but the run time and depth drilled were a little below average. The reason for the somewhat low total depth drilled was that the bit was run into a particularly difficult rock formation of dolomite with sandstone stringers at an excessive speed and weight, and the gage row inserts were broken. Breakage of the inserts was detected at the ground surface and drilling with that bit was ended. It is estimated that 15 to 20 feet of hole after breakage of the inserts was under gage and needed reaming. In exemplary comparable holes, the length of hole needing reaming can range from zero to about 150 feet.

The second experimental bit went in the hole at 1511 feet depth and was withdrawn at 3687 feet, for a total footage drilled of 2176 feet. The drilling time was 33 hours and the average rate of penetration was 66 feet per hour. The weight on the bit ranged from 15,000 to 55,000 pounds (6800 to 25,000 kilograms) and the speed was in the range of from 78 to 120 RPM. The maximum WR of the bit was above average for the rock formation being drilled, namely 545.

In nine offset wells drilled with the same drilling rig at roughly comparable depths in the same formations, an average run was 2680 feet drilled in about 47 hours for an average rate of penetration of 57 feet per hour.

The second experimental bit was pulled from the hole before there was any indication at the ground surface that the bit was dull, damaged or worn. Inspection of the bit showed that there was no perceptible wear on the diamond tipped gage row inserts. A few gage row inserts had minor chipping of the diamond layer. Under these same drilling conditions, appreciable wear would be observed on standard cemented tungsten carbide gage row inserts. It also appears that there was less wear on the cemented tungsten carbide inserts inwardly from the gage row than would be observed in a standard bit having cemented tungsten carbide inserts in the gage row. Almost no wear was seen on the carbide inserts of the test bit. In most bits the inner inserts are so badly worn that the rate of penetration decreases markedly. It is believed that the lack of wear on the gage row inserts not only maintains the full gage of the hole but also affords some protection for tungsten carbide inserts inwardly from the gage row. This may occur since the weight on the bit is more uniformly distributed on the inserts in the absence of gage row wear and the other inserts are not overloaded. Wear resistant gage row inserts may have an additional benefit by protecting the bearings used to mount the cones on the rock bit body. When the bit wears and cuts under gage, or when reaming an under gage hole, there may be an undue load on the cone bearings. Such "pinching" of the bit may contribute to premature bearing failure. Thus, an embodiment of rock bit with gage row inserts tipped with PCD and other inserts of cemented metal carbide is suitable for practice of this invention.

Since the diamond tipped inserts show negligible wear, it is believed that the principal mode of failure is likely to be chipping or breakage of inserts. It is therefore desirable to operate such a bit with higher rotary speed and lower weight than conventional roller cone rock bits. Good circulation is also desirable for removing chips rapidly for minimizing cone wear.

Figure 7:
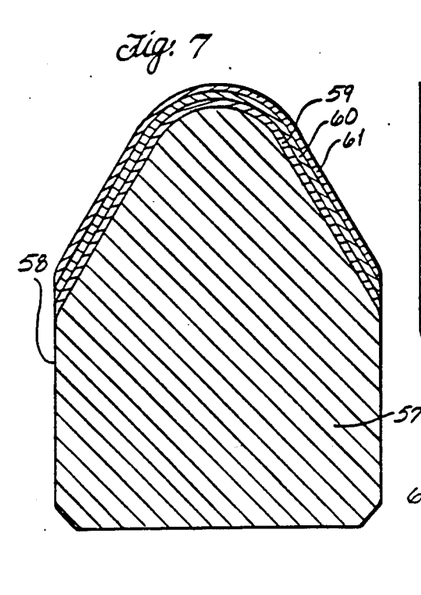
FIG. 7 is a longitudinal cross section of another embodiment of such insert.

FIG. 7 illustrates another embodiment of rock bit insert tipped with polycrystalline diamond as provided in practice of this invention. This insert has a conventional cemented tungsten carbide blank 57 with a cylindrical grip 58 and a converging end on the portion of the insert that protrudes beyond the surface of the cone in which it is pressed. There is an inner layer 59 that is 380 microns thick adjacent to the cemented tungsten carbide blank at the converging end. The inner layer is overlain by an intermediate layer 60 that is 250 microns thick. This in turn is overlain by an outer layer 61 that is 125 microns thick.

The outer layer 61 is PCD as hereinabove described. The intermediate layer is formed of a mixture of 60% by volume PCD (including 6% by volume cobalt) and 40% by volume precemented tungsten carbide. The inner layer is formed of a mixture of 40% by volume PCD and 60% by volume precemented tungsten carbide. After sintering at high pressure and high temperature to form composite materials in the layers as hereinabove described, the volume percentages may differ slightly from the proportions in the original mixture due to interactions. For example, some of the diamond may dissolve in the cobalt phase, thereby slightly reducing the volume proportion of diamond in the PCD and composite.

By having a layer of PCD on the outer surface of the converging portion of the insert, wear of the insert as it is used against a rock formation can be negligible. By providing a transition between the PCD layer and the cemented carbide substrate, a transition in modulus of elasticity and coefficient of thermal expansion helps protect the PCD layer. The intermediate layer 60 near the PCD layer has a relatively higher proportion of PCD and lower proportion of cemented carbide than the inner layer 59, thereby providing a transition between the outer layer and cemented carbide blank in two steps instead of the single step in the embodiment hereinabove described and illustrated in FIG. 6.

FIG. 8 illustrates still another embodiment of insert as provided in practice of this invention. In this embodiment the converging portion of the insert blank 51 has an outer layer 63 of polycrystalline diamond. This outer PCD layer is separated from the blank by an inner layer 64 having a gradual transition of properties between the PCD layer and the cemented carbide blank. Such a transition layer has a high proportion of PCD (e.g, 80% or more by volume) and low proportion of cemented tungsten carbide adjacent to the outer PCD layer 63. There is a gradual diminution in the diamond content of the transition layer 64 with concomitant increase in the proportion of precemented tungsten carbide toward the cemented carbide blank. For example, the polycrystalline diamond content adjacent to the blank may be 20% by volume and the precemented tungsten carbide content may be 80% by volume. A gradual transition in proportion of diamond in the transition layer provides, in effect, a very large number of steps in mechanical properties between the outer PCD layer and the cemented tungsten carbide substrate.

The transition layer provides a transition in a variety of important properties of the PCD layer and carbide substrate. It compensates for differences in coefficient of thermal expansion and modulus of elasticity. It has a sonic velocity intermediate between the PCD and carbide which means that a stress wave travelling through the insert has less stress concentration at the interface. A transition layer of diamond crystals and precemented tungsten carbide particles is significantly different from a mere mixture of diamond, cobalt and carbide powders. It is believed that the precemented carbide particles act as a plurality of "mini-anvils" that provide a pressure distribution in the layer very different from the pressure distribution in a mix of powders, resulting in better compaction. The precemented carbide has less shrinkage than a powder mixture, improving the rheology of pressing. Further, the distribution of carbide in the composite is rather different from a powder; an analogy could be use of steel reinforcing bar in concrete as compared with powdered steel. Significantly different properties can result from the difference in distribution.

It will be apparent that many modifications and variations can be made in the rock bits provided in practice of this invention. One example of a three cone rock bit has been described and illustrated herein with conventional mounting of the cones. Diamond tipped inserts may be used on cones for two cone rock bits or for a variety of other rock bit variations. PCD tipped inserts may be used for all of the cutting structure of the rock bit and not just the gage row inserts.

Further, variations in the inserts themselves will be apparent. For example, in the embodiments herein described the outer PCD layer has a thickness of about 125 microns and thicker layers can be employed if desired. The PCD layer can be in the range of 75 to 600 microns thick. Surprisingly, however, since the PCD is extremely resistant to erosion by rock formations being drilled, a layer only 125 microns thick is adequate for a long life rock bit. The thickness of the transition layer, or layers, can range from 100 microns to 3 millimeters or more. Other proportions of PCD and precemented carbide particles in the transition layers may also be used as desired. For example, these layers can range from 5 to 95% by volume polycrystalline diamond and from 95 to 5% precemented tungsten carbide. Depending on the binder content of the cemented tungsten carbide, additional cobalt may be included in the mixture for good sintering of the transition layer. Other metal carbides such as tantalum carbide or titanium carbide may be suitable in some embodiments.

Persons skilled in the art and technology to which this invention pertains will readily discern that the preceding description has been presented with reference to the currently preferred embodiment of the invention and that variations can be made in the embodiments without departing from the essence and scope of the invention.

What is claimed is:

1. A percussion rock bit, comprising:
   a steel body;
   means at one end of the steel body for connecting the bit to a drill string;
   a plurality of inserts embedded in the other end of the steel body, at least a portion of the inserts comprising:
   a cemented tungsten carbide body having a grip portion embedded in the steel body and a converging end portion protruding from the surface of the steel body;
   a polycrystalline diamond layer on the converging end of the carbide body;
   at least one transition layer between the polycrystalline diamond layer and the carbide body, such a transition layer comprising a composite containing diamond crystals and precemented tungsten carbide particles, where the diamond crystal content is greater adjacent the polycrystalline diamond layer and lower adjacent the cemented tungsten carbide body.

2. A rock bit as claimed in claim 1, where the polycrystalline diamond layer includes from about one to about ten percent by volume cobalt.

3. A rock bit as claimed in claim 2, comprising two transition layers between the polycrystalline diamond layer and the tungsten carbide body.

4. A rock bit as claimed in claim 3, where the outer transition layer adjacent the polycrystalline diamond layer comprises about 75 percent by volume diamond crystals and about 25 percent by volume precemented tungsten carbide.

5. A rock bit as claimed in claim 4, where the diamond crystals include from about one to about ten percent by volume cobalt.

6. A rock bit as claimed in claim 4, where the inner transition layer adjacent the cemented tungsten carbide body comprises about 50 percent by volume diamond crystals and about 50 percent by volume precemented tungsten carbide particles.

7. A rock bit as claimed in claim 6, where the diamond crystals include from about one to about ten percent by volume cobalt.

8. A rock bit as claimed in claim 3, where the outer transition layer adjacent the polycrystalline diamond layer comprises about 60 percent by volume diamond crystals and about 40 percent by volume precemented tungsten carbide.

9. A rock bit as claimed in claim 8, where the diamond crystals include from about one to about ten percent by volume cobalt.

10. A rock bit as claimed in claim 8, where the inner transition layer adjacent the tungsten carbide body comprises about 40 percent by volume diamond crystals and about 60 percent by volume precemented tungsten carbide.

11. A rock bit as claimed in claim 10, where the diamond crystals include from about one to about ten perecent by volume cobalt.

12. A percussion rock bit comprising a steel body including a plurality of inserts partially embedded in the steel body for crushing rock at the bottom of a hole being drilled, at least some of the inserts comprising a cemented tungsten carbide body, a polycrystalline diamond layer on the outermost end of the insert, and two transition layers between the polycrystalline diamond layer and the cemented tungsten carbide body comprising a composite material of diamond crystals, precemented tungsten carbide and cobalt, the transition layer adjacent the polycrystalline layer having a greater proportion of diamond crystals relative to precemented tungsten carbide than the transition layer adjacent the cemented tungsten carbide body.

13. A percussion rock bit as claimed in claim 12, where the polycrystalline diamond layer includes from about one to about ten percent by volume cobalt.

14. A percussion rock bit as claimed in claim 12, where the outer transition layer adjacent the polycrystalline diamond layer comprises about 75 percent by volume diamond crystals and about 25 percent by volume precemented tungsten carbide.

15. A percussion rock bit as claimed in claim 14, where the diamond crystals include from about one to about ten percent by volume cobalt.

16. A percussion rock bit as claimed in claim 14, where the inner transition layer adjacent the cemented tungsten carbide body comprises about 50 percent by volume diamond crystals and about 50 percent by volume precemented tungsten carbide particles.

17. A percussion rock bit as claimed in claim 16, where the diamond crystals include from about one to about ten percent by volume cobalt.

18. A percussion rock bit as claimed in claim 12, where the outer transition layer adjacent the polycrystalline diamond layer comprises about 60 percent by volume diamond crystals and about 40 percent by volume precemented tungsten carbide.

19. A percussion rock bit as claimed in claim 18, where the diamond crystals include from about one to about ten percent by volume cobalt.

20. A percussion rock bit as claimed in claim 18, where the inner transition layer adjacent the tungsten carbide body comprises about 40 percent by volume diamond crystals and about 60 percent by volume precemented tungsten carbide.

21. A percussion rock bit as claimed in claim 20, where the diamond crystals include from about one to about ten percent by volume cobalt.

22. An insert comprising a cylindrical cemented tungsten carbide body having a converging portion at one end, the converging portion having an outer layer comprising polycrystalline diamond and two transition layers comprising a composite of diamond crystals, precemented tungsten carbide and cobalt, the outer transition layer adjacent the polycrystalline diamond layer having a greater diamond crystal content than the inner transition layer adjacent the tungsten carbide body.

23. An insert as claimed in claim 22, where the outer transition layer adjacent the polycrystalline diamond layer comprises about 75 percent diamond crystals and about 25 percent by volume precemented tungsten carbide.

24. An insert as claimed in claim 23 where the diamond crystals include from about one to about ten percent by volume cobalt.

25. An insert as claimed in claim 23, where the inner transition layer adjacent the cemented tungsten carbide body comprises about fifty percent by volume diamond crystals and about fifty percent by volume precemented tungsten carbide particles.

26. An insert as claimed in claim 25, where the diamond crystals include from about one to about ten percent by volume cobalt.

27. An insert as claimed in claim 22, where the outer transition layer adjacent the polycrystalline diamond layer comprises about 60 percent by volume diamond crystals and about 40 percent by volume precemented tungsten carbide.

28. An insert as claimed in claim 27, where the diamond crystals include from about one to about ten percent by volume cobalt.

29. An insert as claimed in claim 27, where the inner transition layer adjacent the tungsten carbide body comprises about 40 percent by volume diamond crystals and about 60 percent by volume precemented tungsten carbide.

30. An insert, as claimed in claim 29, where the diamond crystals include from about one to about ten percent by volume cobalt.

31. An insert partially embedded in a steel rock bit for crushing rock at the bottom of a hole being drilled, comprising a cylindrical body including two pieces of cemented tungsten carbide bonded together, an inner carbide piece being embedded in the steel rock bit body and comprising relatively softer tungsten carbide, and an outer carbide piece protruding from the rock bit body comprising relatively harder carbide, a layer including polycrystalline diamond on the protruding piece, and at least one transition layer between the polycrystalline diamond layer and the outer carbide piece, where the transition layer comprises a composite material of diamond crystals and precemented tungsten carbide.

32. A rock bit comprising:
a steel body;
means at one end of the body for connecting the bit to a drill string;
means at the opposite end of the body for mounting at least one roller cone on the body for rotation around an axis transverse to the axis of the bit;
at least one roller cone so mounted on the body for rolling on the bottom of a bore hole being drilled;
a plurality of inserts in such a cone for crushing rock at the bottom of such a bore hole, at least a portion of such inserts comprising:
a cemented tungsten carbide body having a grip length embedded in the cone and a converging end portion protruding from the surface of the cone;
a polycrystalline diamond layer on the converging end of the carbide body; and
at least one transition layer between the polycrystalline diamond layer and the carbide body, the transition layer comprising a composite containing diamond crystals and precemented tungsten carbide particles.

33. A rock bit as recited in claim 32 wherein the transition layer comprises 40% by volume polycrystalline diamond and 60% by volume precemented tungsten carbide particles.

34. A rock bit as recited in claim 33 wherein the polycrystalline diamond layer includes from 1 to 10% by volume cobalt.

35. A rock bit as recited in claim 32 wherein the polycrystalline diamond layer has a thickness in the range of from 75 to 600 microns.

36. A rock bit as recited in claim 35 wherein the transition layer has a thickness in the range of from 100 to 600 microns.

37. A rock bit as recited in claim 36 wherein the transition layer comprises from 5 to 95% by volume diamond and from 95 to 5% by volume precemented tungsten carbide.

38. A rock bit as recited in claim 32 comprising a second transition layer between the first transition layer and the cemented tungsten carbide body, the second transition layer comprising a composite containing a lower proportion of diamond crystals and a higher proportion of precemented tungsten carbide than the first transition layer.

39. A rock bit as recited in claim 32 wherein the transition layer has a gradual transition between a relatively higher diamond content and relatively lower precemented tungsten carbide content adjacent to the polycrystalline diamond layer, and a relatively lower diamond content and relatively higher precemented tungsten carbide content adjacent to the tungsten carbide body.

40. A rock bit wherein inserts as recited in claim 32 are in a gage row of inserts in such cone.

41. A rock bit as recited in claim 40 wherein the inserts inwardly from the gage row inserts comprise cemented tungsten carbide without a layer of polycrystalline diamond.

42. A rock bit as recited in claim 32 wherein such an insert has a converging end portion selected from the group consisting of a projectile shape, a cone with a rounded end, a chisel shape, and hemispherical.

43. A rock bit as recited in claim 32 wherein substantially the entire converging portion of such an insert has a polycrystalline diamond layer and a transition layer comprising diamond crystals and precemented tungsten carbide between the diamond layer and the cemented tungsten carbide body.

44. An insert for a roller cone rock bit comprising:
a cemented metal carbide body having a grip length for insertion in the cone of a roller cone rock bit and a converging portion at one end for protruding beyond the face of the cone;
a polycrystalline diamond layer on at least a major portion of the protruding converging end of the body; and
a transition layer between the body and the polycrystalline diamond layer comprising a mixture of precemented metal carbide particles and diamond crystals, at least a portion of the diamond crystals being bonded directly to other diamond crystals.

45. An insert as recited in claim 44 wherein the body is formed of cobalt cemented tungsten carbide and the transition layer comprises tungsten carbide precemented with cobalt.

46. An insert as recited in claim 45 wherein the transition layer comprises 40% by volume polycrystalline diamond and 60% by volume precemented tungsten carbide particles.

47. An insert as recited in claim 45 wherein the polycrystalline diamond layer includes from 1 to 10% by volume cobalt.

48. An insert as recited in claim 45 comprising a second transition layer between the first transition layer and the cemented tungsten carbide body, the second transition layer comprising a composite containing a lower proportion of diamond crystals and a higher proportion of precemented tungsten carbide than the first transition layer.

49. An insert as recited in claim 45 wherein the transition layer has a gradual transition between a relatively higher diamond content and relatively lower precemented tungsten carbide content adjacent to the polycrystalline diamond layer, and a relatively lower diamond content and relatively higher precemented tungsten carbide content adjacent to the tungsten carbide body.

50. An insert as recited in claim 45 wherein the transition layer comprises from 5 to 95% by volume diamond and from 95 to 5% by volume precemented tungsten carbide particles.

51. An insert as recited in claim 44 wherein the polycrystalline diamond layer has a thickness in the range of from 75 to 600 microns.

52. An insert as recited in claim 44 wherein the transition layer has a thickness in the range of from 100 to 600 microns.

53. An insert as recited in claim 44 wherein the insert has a converging end portion selected from the group consisting of a projectile shape, a cone with a rounded end, a chisel shape, and hemispherical.

54. An insert as recited in claim 44 wherein substantially the entire converging portion has a polycrystalline diamond layer and a transition layer comprising diamond crystals and precemented tungsten carbide between the diamond layer and the cemented tungsten carbide body.

* * * * *